United States Patent Office 2,832,778
Patented Apr. 29, 1958

2,832,778

PREPARATION OF 2,4-BIS(ALKYL)-6-HYDROXY-1,3,5-TRIAZINES

Hansjuergen Schroeder and Christoph J. Grundmann, Columbus, Ohio, assignors to Olin Mathieson Chemical Corporation, a corporation of Virginia No Drawing. Application September 1, 1955
Serial No. 532,120

3 Claims. (Cl. 260—248)

Our invention relates to novel 2,4-bis-alkyl substituted)-6-hydroxy-1,3,5-triazines. Our novel compounds have the general formula:

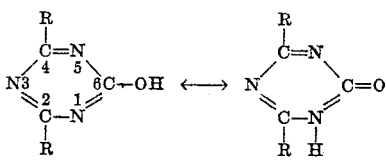

wherein R is an alkyl radical. Preferred alkyl radicals are the lower alkyl radicals having from 1 to 4 carbon atoms, i. e. methyl, ethyl, propyl and butyl, although alkyl radicals containing up to 12 carbon atoms are included in the scope of this invention. Our compounds are useful as intermediates.

The compounds of our invention are prepared by treating 2,4 - bis(alkyl substituted) - 6 - hydroxy-1,3,5-triazine amidine salts of the general formula

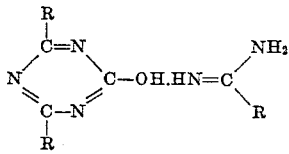

wherein R is an alkyl radical with hydrogen halide, e. g. hydrogen chloride, and an alkali. The alkyl triazine amidine salts are described and claimed in our pending application Serial No. 529,927, filed August 22, 1955, and are prepared by catalytic hydrogenolysis of haloalkyl triazine amidines prepared from phosgene and haloalkyl amidines. Treatment of the monohydroxy triazine amidine salts with hydrogen chloride results in the formation of an amidine hydrochloride and the precipitation of the monohydroxy triazine hydrochloride hydrate. The latter is then converted to the free hydroxy triazine by treatment with an alkali such as alkaline earth or alkali metal hydroxides, e. g. sodium hydroxide.

The compounds of our invention are useful in preparing 2,4-bis(alkyl)-6-halo-1,3,5-triazines of the general formula:

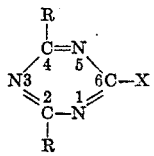

wherein R is an alkyl radical and X is a halogen, by reaction with a phosphorus oxyhalide. These halo-triazines are described and claimed in our pending application Serial No. 529,928, filed August 22, 1955. They are useful as fungicides and intermediates.

The novel compounds of our invention and their preparation will be further illustrated by reference to the following example.

Example I (A) 54 grams of trichloroacetamidine was added with stirring to 400 milliliters of water at 25° C. The amidine dissolved completely upon the addition of approximately one-fourth of a solution of 20 grams of NaOH in 50 milliliters of $H_2O$. The solution was cooled to and maintained at 5–10° C. throughout the course of the reaction. A solution of 25 grams of $COCl_2$ in 120 milliliters of toluene was added dropwise with efficient stirring until the pH reached a value of 6. By alternate addition of phosgene and more of the above mentioned NaOH solution, the pH was maintained at 8–10. Finally the pH was brought to 6, the precipitated 2,4-bis(trichloromethyl)-6-hydroxy-1,3,5-triazine-trichloroacetamidine salt was filtered by suction and dried in vacuum over $P_2O_5$. The yield was 41 grams or 74 percent of theory of the salt having a melting point of 218–224° C.

Purification for analysis was accomplished by dissolving the product in ethanol and precipitating it with cold water. It then had a melting point of 222–224° C.

|  | C | H | N | Cl |
|---|---|---|---|---|
| Calculated for $C_7H_4N_5OCl_9$ | 17.04 | 0.82 | 14.20 | 64.69 |
| Found | 17.67 | 1.29 | 14.48 | 63.49 |
|  | 17.63 | 1.22 | 14.36 | 63.52 |

(B) A mixture of 7.0 grams of the 2,4-bis-(trichloromethyl)-6-hydroxy-1,3,5-triazine-trichloroacetamidine salt of part A of this example, 13.1 grams of triethylamine, 4 grams of 2 percent palladium on carbon and 80 milliliters of methanol was shaken at room temperature with hydrogen. After the absorption of hydrogen was complete, the catalyst was filtered off by suction and a solution of sodium hydroxide was added, to the filtrate, in sufficient amount to convert the triethylamine hydrochloride into triethylamine and sodium chloride. After filtering off the precipitated NaCl, the filtrate was evaporated to dryness at reduced pressure. The residue was taken up with alcohol and the dimethylhydroxytriazine-acetamidine salt was precipitated with ether. The yield was 1.5 grams or 58 percent of the theory of the salt which, after vacuum sublimation, had a melting point of 212–213° C.

|  | C | H | N |
|---|---|---|---|
| Calculated for $C_7H_{13}N_5O$ | 45.88 | 7.15 | 38.23 |
| Found | 45.83 | 7.06 | 38.06 |
|  | 45.94 | 7.00 | 38.30 |

(C) Hydrogen chloride was passed into a solution of 2.5 grams of the dimethyl-hydroxytriazine-acetamidine salt (obtained by the method of the preceding paragraph), in 15 milliliters of ethanol, for 15 minutes. The precipitated 2,4-dimethyl-6-hydroxy-1,3,5-triazine-hydrochloride monohydrate was filtered off by suction and washed with 10 milliliters of cold ethanol to remove traces of acetamidine hydrochloride. The yield was 1.7 grams or 70 percent of the theory of product which melted at 177–179° C.

|  | C | H | N | Cl |
|---|---|---|---|---|
| Calculated for $C_5H_7N_3O.HCl.H_2O$ | 33.43 | 5.61 | 23.40 | 19.74 |
| Found | 34.21 | 5.41 | 23.79 | 19.71 |

(D) A solution comprising 1.17 grams of the 2,4-dimethyl - 6 - hydroxy - 1,3,5 - triazine - hydrochloride monohydrate in 15 milliliters of methanol was treated with 2.6 milliliters of a 10 percent solution of sodium hydroxide. The methanol was then evaporated in vacuo, and the residue was sublimed at 150° C. and 0.05 mm. Hg. The sublimate was recrystallized from acetone and the yield was 490 milligrams or 60 percent of the theory of 2,4-dimethyl-6-hydroxy-1,3,5-triazine which melted at 230–231° C.

|  | C | H | N |
|---|---|---|---|
| Calculated for $C_5H_7N_3O$ | 47.99 | 5.64 | 33.57 |
| Found | 47.95 | 5.73 | 33.52 |

*Example II*

A mixture of 0.5 gram of free 2,4-dimethyl-6-hydroxy-1,3,5-triazine, 4 grams of $POCl_3$ and 0.5 gram of triethylamine was refluxed for 30 minutes. The excess of $POCl_3$ and the dimethylchlorotriazine were then removed by distillation. The 2,4-dimethyl-6-chloro-1,3,5-triazine crystallized in the condenser and, after cooling, in the distilled $POCl_3$. After filtering off from the $POCl_3$, it was dissolved in ether, filtered, and the ethereal solution evaporated. The residue was recrystallized from Skellysolve. The yield was 85 milligrams or 15 percent of the theory of product which melted at 64° C.

We claim:
1. A process for preparing 2,4-bis(alkyl)-6-hydroxy-1,3,5-triazine which comprises reacting 2,4-bis(alkyl)-6-hydroxy-1,3,5-triazine amidine salt of the formula

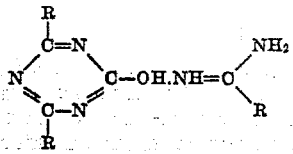

in which R is an alkyl radical containing not more than 12 carbon atoms, with hydrogen halide to form the corresponding hydroxy triazine hydrohalide hydrate and reacting the hydrohalide hydrate with an alkali to obtain the free hydroxy triazine.

2. The process of claim 1 in which the hydrogen halide is hydrogen chloride.

3. The process of preparing 2,4-dimethyl-6-hydroxy-1,3,5-triazine which comprises reacting 2,4-dimethyl-6-hydroxy-1,3,5-triazine acetamidine salt with hydrogen chloride to precipitate 2,4-dimethyl-6-hydroxy-1,3,5-triazine-hydrochloride monohydrate and reacting the hydrochloride monohydrate with sodium hydroxide.

References Cited in the file of this patent

UNITED STATES PATENTS

| 2,691,018 | Joyce | Oct. 5, 1954 |
| 2,714,057 | Chenicek | July 26, 1955 |

FOREIGN PATENTS

| 302,011 | Italy | Oct. 17, 1932 |
| 303,047 | Italy | Nov. 17, 1932 |

OTHER REFERENCES

Beilstein's Handbuch der Organische Chemie, 4th ed. (1937), vol. 26, page 154, system No. 3873.

Ostrogovich: Gazz. Chim. Ital., vol. 27 (1897), p. 426–427.

Adams et al.: J. Org. Chem. 17 No. 8, p. 1163-1164, August 1952.